May 18, 1926.
R. G. HANDY ET AL
GOVERNOR
Original Filed Sept. 1, 1921    2 Sheets-Sheet 1
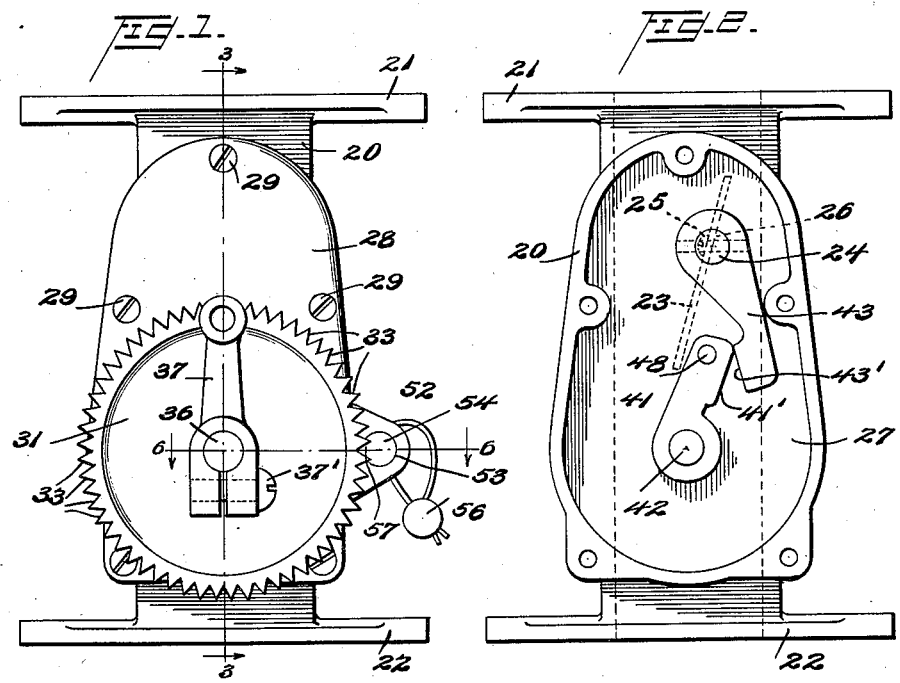
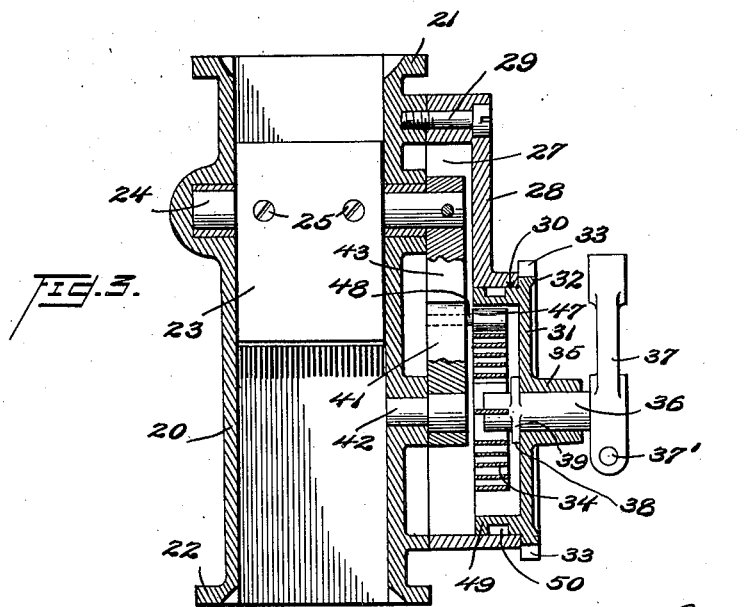
Inventors.
R. G. Handy,
A. A. Bull,
By Watson, Cott, Moore & Grindle,
Att'ys May 18, 1926. 1,584,930
R. G. HANDY ET AL
GOVERNOR
Original Filed Sept. 1, 1921   2 Sheets-Sheet 2
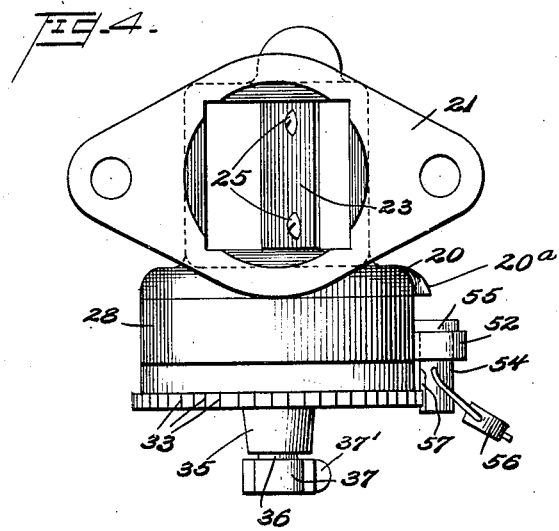
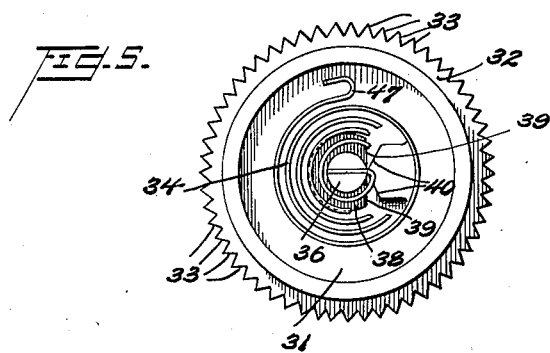
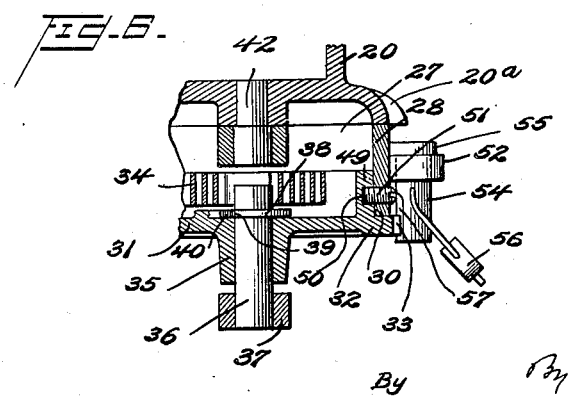

Patented May 18, 1926.

1,584,930

UNITED STATES PATENT OFFICE.

ROBERT G. HANDY AND ARTHUR A. BULL, OF DETROIT, MICHIGAN, ASSIGNORS TO HANDY GOVERNOR CORPORATION, OF DETROIT, MICHIGAN, A CORPORATION OF MICHIGAN.

GOVERNOR.

Application filed September 1, 1921, Serial No. 497,461. Renewed November 21, 1925.

The present invention relates to governors for hydrocarbon motors and more particularly to the means for adjusting the setting of the same. It is well recognized that the motors of motor vehicles should be provided with some means to limit the speed of the motor or vehicle. Preferably the speed limiting means or governor should be locked against change or tampering by the operator so that the maximum desired speed may not be exceeded. Many such governors have been placed on the market, most of them being adjustable to vary the maximum speed allowed and having a seal or lock for preventing tampering with the adjusting device. In addition to the foregoing adjustment, which may be termed the main adjustment, it is desirable to have a manual adjustment constructed and arranged so that the governor may be set to govern the speed of the engine at something less than the maximum determined by the main adjustment. For example it is desirable to plow at different rates in different soils. With the manual adjustment mentioned above it it possible to set the governor so that the tractor will operate at any one of a plurality of speeds below the maximum determined by the main adjustment. Again when using the motor of a tractor or other vehicle for operating another machine such as a thrashing machine, it may be necessary to run the motor at a lower speed than the maximum usually determined by the governor.

The present invention aims to provide a manual adjustment whereby the motor may be run at a lower constant speed than the maximum allowed by the governor. To this end the invention consists of a governor having a main adjusting means for determining the limiting speed of the motor adapted to be locked against tampering; and a supplemental means, manually adjustable, to set the governor to operate at a speed within said limit. The invention also comprehends the use of the manual adjustment without the main adjustment.

The objects and features of novelty will be apparent from the description taken in connection with the drawings in which Figure 1 is a front side elevation of one type of governor having the present invention embodied therein;

Figure 2 is a similar view with the cover plate removed;

Figure 3 is a sectional elevation taken substantially on the line 3—3 of Fig. 1;

Figure 4 is a top plan view of the governor shown in Fig. 1;

Figure 5 is an inside view of the adjusting cap and clock spring associated therewith and Figure 6 is a sectional view of a detail taken substantially on the line 6—6 of Fig. 1.

Referring to the drawings the present invention is illustrated in connection with a governor described and claimed in our co-pending application Serial No. 383,259 filed May 21, 1920. It is to be understood however that the invention is not limited to being employed with this particular type of governor. Briefly stated, the governor shown comprises a hollow casting 20 having end flanges 21 and 22 adapting the casting to be secured to form a part of the intake conduit of the motor. Disposed within the intake conduit is a butterfly valve comprising the plate 23 secured to the spindle 24 in any suitable manner as by means of the screws 25. As clearly shown in Fig. 2 the spindle 24 is slabbed off at 26 to afford a flat seat for the plate 23. Furthermore the axis of spindle 24 is disposed toward one side of the valve plate 23 with respect to its center line, so that the valve is unbalanced. The effort tending to close the valve 23 or similar obstructing means increases at an accelerated rate as the valve is moved in a closing direction. This closing effort is counterbalanced when the motor is operating at a constant speed by a yielding device and transmitting mechanism.

As illustrated a chamber 27 is formed between one wall of the intake conduit and an enclosing housing 28, this housing being secured to the side of the conduit in any suitable manner as by means of the screws 29. The housing is formed with a circular opening 30 within which is fitted a circular cap 31 having a radially extending flange 32 formed with serrations 33. The yieldable device referred to consists of a coiled or watch spring 34 carried by the cap 31. One end of this spring, as shown the outer end, is formed with a hook 47 which receives a pin 48 carried by an arm 41 pivotally mounted on a pin 42. This arm 41 is provided with a cam surface 41' adapted to cooperate with a cam surface 43' on an arm 43 secured to the spindle 24. The arrangement and construction is such that the spring 34 has its force varied by means of the transmitting mechanism so that as the butterfly valve moves in a closing direction, its movement is opposed by an equal and opposite resistance when the motor is operating at a constant predetermined speed.

It will be observed that the maximum speed permitted by the governor is controlled by the tension of the yielding means or spring 34. If the spring 34 exerts no opposition to the closing of the valve obviously the intake conduit will be obstructed by the valve at a very low speed. As the tension of the spring 34 is increased the maximum allowed speed of the motor is increased. According to the present invention means is provided for manually varying the tension of spring 34 up to a certain amount which can not be exceeded, thus permitting adjustment of the governed speed of the motor to any amount within a certain predetermined maximum.

As shown the cap 31 is provided with a central boss 35 through which extends a short shaft 36, the interior end of which is slotted and has the inner end of the spring disposed therein as shown in Fig. 5. The shaft 36 projects outside the cap and carries an arm 37 adjustably secured thereto for rotation therewith in any suitable manner. As shown, the end of the arm is split and clamped on the shaft 36 by a screw 37'. Between the spring 34 and the cap the shaft 36 is formed with a flange 38 which is slabbed off as at 39 and adapted to contact after limited rotation with the inclined faces or shoulders 40 formed on the inside of the cap 31. Thus the shaft 36 may be turned through a slight angle by the arm 37 and thereby adjust the tension of the spring 34. This constitutes the manually operable means for adjusting the governor to permit its operation at any speed below a predetermined maximum. As the shaft 36 has only limited rotation in the direction to increase the tension of the spring, the maximum speed allowed by the governor will be determined by the position of the stop which limits said rotation of the shaft 36. It is obvious that this stop or surface 40 may be non-adjustable. On the other hand it is preferred to have the same mounted for adjustment, but secured against tampering by the operator. To this end, as shown in the drawing, the spring-carrying cap 31 has an axially extending flange 49 rotatively fitting within the opening 30. It will be seen that rotation of the cap 31 varies the position of the stops or shoulders 40 and hence determines the maximum speed permitted by the governor. In the form shown in order to prevent removal of the cap 31, the flange 49 is provided with a peripheral groove 50 into which projects a set screw 51 carried by the housing 28. For the purpose of locking the cap 31 in any adjusted position, the housing 28 is provided with a lug 52 formed with an opening 53 for a pin 54. This pin has a head 55 engaging one side of the lug and is long enough to fit in any one of the serrations 33 on the periphery of the cap, the end of the pin being formed with teeth 57 for this purpose. The pin 54 may be held against removal by a sealing means such as indicated at 56 and against backing out of the lug 52 by the stop 20ᵃ on the casting 20. It is to be noted that the set screw 51 is positioned so that the pin 54 renders the same inaccessible. In other words it is necessary to remove pin 54 before set screw 51 can be loosened, and the cap 31 removed.

From the foregoing it will be seen that the tension of spring 34 may be adjusted by turning cap 31, this adjustment being termed the main adjustment of the governor and determining the maximum speed permitted by the governing mechanism. Furthermore the governor may be set to operate at any constant speed below the maximum by the manual adjustment of arm 37.

Although the invention has been described as embodied in a specific form of governor it is to be understood that the invention is not thus limited as it may be adapted for use in connection with other forms of governors.

Having thus described our invention what we claim as new and desire to secure by Letters Patent is:

1. In a governing device, in combination, a clock spring opposing movement of said device in one direction, main adjusting means for said spring, means to lock said adjusting means in adjusted position and against tampering, and manually operable means to adjust said spring within the limit set by the main adjusting means.

2. In a governing device, in combination, an adjustable support, a clock spring opposing movement of said device in one direction, a member carried by said support engaging one end of said spring, said member being manually adjustable within limits, and means to lock said support in adjusted position and against tampering.

3. In a governing device, in combination, a rotatably adjustable cap, a clock spring opposing movement of said device in one direction, a member carried by said cap engaging one end of said spring and manually operable to vary the tension of said spring within the limit set by said cap, and means to lock said cap in adjusted position and against tampering.

4. In a governing device, in combination, a housing, a spring in said housing controlling the movement of said device, a manually operable member secured to one end of said spring, a support for said member, means limiting the movement of said member relative to said support, said housing carrying said support for adjustment to limit the maximum tension of said spring and means to lock said support in adjusted position and against tampering.

5. In a governing device, in combination, a housing, a rotatably adjustable support carried by said housing, a spring enclosed in said housing controlling the operation of said device, a manually operable member secured to one end of said spring, means limiting the movement of said member relative to said support, and means to lock said support in adjusted position and against tampering to limit the maximum tension of the spring.

6. In a governing device, in combination, a housing having a circular opening, a cap closing said opening and rotatably adjustable therein, a yielding device controlling the operation of said device, a manually operable member adjustably carried by said cap and connected to said yielding device for varying the effect of the same on the governing device, means limiting the movement of said member relative to the cap and means to lock the cap in adjusted position preventing tampering with said yielding device, the adjustment of said cap determining the maximum effect of said yielding device.

7. In a governing mechanism, in combination, a housing having a circular opening, a cap closing said opening and rotatably adjustable therein, a circularly acting yielding device controlling the operation of said mechanism disposed coaxially with said cap and within said housing, a manually operable member rotatively mounted at the center of said cap extending through the same and engaging said device to adjust the same, means limiting movement of said member relative to said cap, and means locking the cap in adjusted position, the adjustment of said cap determining the maximum effect of said device.

8. In a governing mechanism, in combination, a housing having a circular opening, a cap closing said opening and rotatably adjustable therein, a clock spring controlling the action of said mechanism disposed within said housing, a shaft at the center of the cap extending through the same and secured to the inner end of said spring, means limiting rotation of the shaft relative to the cap, and means locking the cap in adjusted position, the adjustment of said cap determining the maximum speed permitted by the governor and said shaft constituting means for adjusting the governor for a lower speed.

9. In a governing mechanism, in combination, a housing having a circular opening, a cap closing said opening and rotatably adjustable therein, a clock spring within the housing carried by said cap controlling the operation of said mechanism, means to lock said cap in adjusted position to determine the maximum speed permitted by the governor, and manually operable means having limited movement relative to the cap and operative on one end of the spring to adjust the governor for speeds below said maximum.

10. In a governing mechanism, in combination, a housing, a clock spring within the housing controlling the action of the mechanism, main adjusting means carrying said spring and operable therein to determine the maximum speed permitted by the governor, means to lock said main adjusting means, and manually operable supplemental spring adjusting means to vary the speed below the maximum set by said main adjusting means.

11. In a governor for hydrocarbon motors, an adjustable spring support, means securing said support against removal without interfering with adjustment thereof and means locking the support in adjusted position, said securing means being covered by the locking means and accessible only after removal of the locking means.

12. In a governor for hydrocarbon motors, a housing, a spring supporting cap rotatably carried by said housing, means securing the cap against axial movement without interfering with rotative movement thereof, and means locking the cap against rotative movement, said locking means being disposed to prevent access to said first mentioned means.

13. In a governing mechanism, in combination, a housing, a clock spring within the housing, a manually operable rotatably mounted shaft engaging the inner end of said spring to adjust the tension thereof, and a stop limiting the rotation of the shaft in the direction to increase the speed permitted by the governor, whereby the mechanism may be manually set at any speed below a predetermined maximum.

14. In a governing mechanism, in combination, a housing, a clock spring within the housing, manually operable means engaging one end of the spring to adjust the tension thereof, and means limiting movement of said manually operable means in the direction to increase the speed permitted by the mechanism, whereby the governor may be manually set at any speed below a predetermined maximum.

15. The combination with a throttle for governing the speed of a motor, of controlling mechanism therefor including a yielding device, means to transmit the force of said device to said throttle constructed and arranged to multiply the effect of said device as the throttle closes, and means always under the control of the operator to vary the force of said device and thereby the speed of the motor.

16. A governing device for the intake of hydrocarbon motors including in combination, an intake conduit, means in said conduit adapted to be actuated to obstruct said conduit in accordance with the flow of fluid therein, resisting means, and mechanism transmitting the effort of said resisting means to oppose the obstruction of said conduit, said transmitting mechanism being constructed and arranged to a vary the effort exerted on said obstructing means by said resisting means as the obstruction of the conduit varies, means to limit the maximum effort of said resisting means and means to adjust the resisting means within said maximum to thereby vary the settings of said device.

17. A governing device for hydrocarbon motors comprising an intake conduit, an unbalanced butterfly valve therein, and a counterbalancing means connected to balance the turning effort of said valve at a predetermined speed of the motor including an arm secured to turn with said valve, yielding means acting on said arm having its point of action shifted radially as the arm turns to vary the effort of the yielding means on the valve as it closes, means to limit the maximum effort of said yielding means and thereby the maximum speed of the motor, and means to adjust said yielding means within said maximum to thereby vary the settings of said device.

18. A governing device for hydrocarbon motors comprising an intake conduit, an unbalanced butterfly valve therein, and a counterbalancing means connected to balance the turning effort of said valve at a predetermined speed of the motor including an arm secured to turn with said valve, a spring acting on said arm having its point of action shifted radially as the arm turns to vary the effort of the spring on the valve as it closes, means to limit the maximum effort of said spring and thereby the maximum speed of the motor, and means to adjust said spring within said maximum to thereby vary the settings of said device.

19. A governing device for hydrocarbon motors including in combination, an intake conduit, an unbalanced butterfly valve therein having a spindle, an arm secured to said spindle, yielding means, a second pivotally mounted arm acted on by said means, said arms having adjacent cam surfaces constructed to shift the point of contact thereof radially of the arms as they turn and means always under the control of the operator to vary the effort of said yielding means and thereby the speed of the motor.

20. A governing device for hydrocarbon motors comprising an intake conduit, an unbalanced butterfly valve therein, and a counterbalancing means connected to balance the turning effort of said valve at a predetermined speed of the motor including an arm secured to turn with said valve, and yielding means acting on said arm having its point of action shifted radially as the arm turns to increase the effort of the yielding means on the valve as it closes, means to adjust the limit of action of said yielding means and supplemental means to adjust the yielding means within said limit.

21. A governing device for the intake of hydrocarbon motors including in combination, an intake conduit, means in said conduit adapted to be actuated to obstruct said conduit in accordance with the flow of fluid therein, yielding means, and mechanism transmitting the effort of said yielding means to oppose the obstruction of said conduit, said transmitting mechanism being constructed and arranged to vary the effort exerted on said obstructing means by said yielding means as the obstruction of the conduit varies, adjustable means to limit the effort of said yielding means, and manually operable means to adjust said yielding means within said limit.

22. A governing device for the intake of hydrocarbon motors including in combination, an intake conduit, means in said conduit adapted to be actuated to obstruct said conduit in accordance with the flow of fluid therein, yielding means, and mechanism transmitting the effort of said yielding means to oppose the obstruction of said conduit, said transmitting mechanism being constructed and arranged to vary the effort exerted on said obstructing means by said yielding means as the obstruction of the conduit varies and manually operable means to adjust said yielding means and thereby vary the speed of the motor.

23. A governing device for the intake of hydrocarbon motors including in combination, an intake conduit, means in said conduit adapted to be actuated in accordance with the flow of the fluid to obstruct said conduit, and means adapted to oppose the obstruction of said conduit with a resistance that increases at an accelerated rate as the obstruction becomes more complete, said resistance being equal to the obstructing effort exerted by the flow of fluid at a predetermined speed of the motor and being unequal at other speeds and manually operable means always accessible to adjust said resistance to thereby vary said predetermined speed.

24. A governing device for the intake of hydrocarbon motors including in combination, an intake conduit, a butterfly valve in said conduit pivoted to swing about an axis at one side of its center line whereby the operation of the engine acts to close said valve, and means constructed and arranged to oppose the closing movement of said valve with a resistance equal and opposite to the closing tendency of the valve when the engine is running at a predetermined speed, said resistance being unequal to said tendency at other speeds and manually operable means always accessible to adjust said resistance to thereby vary said predetermined speed.

25. A governing device for the intake of hydrocarbon motors including in combination, an intake conduit, a butterfly valve in said conduit pivoted to swing about an axis at one side of its center line whereby the operation of the engine acts to close said valve, and means constructed and arranged to oppose the closing movement of said valve with a resistance equal and opposite to the closing tendency of the valve when the engine is running at a predetermined speed, said resistance being unequal to said tendency at other speeds, main adjusting means for said resistance, means to lock said adjusting means against tampering, and manually operable means to adjust said resistance within the limit set by the main adjusting means.

26. A governing device for the intake of hydrocarbon motors comprising in combination, a conduit, a valve in said conduit mounted to turn about an axis transverse thereto and to be actuated in a closing direction by the operation of the motor, yielding means, and means transmitting the effort of said yielding means to oppose closing of said valve, constructed and arranged to increase the effort of the yielding means on the valve as the valve moves in the closing direction, main adjusting means for said yielding means, means to lock said adjusting means against tampering, and manually operable means to adjust said yielding means within the limit set by the main adjusting means.

27. A governing device for the intake of hydrocarbon motors comprising in combination, a conduit, a valve in said conduit mounted to turn about an axis transverse thereto and to be directly acted on by the suction to move the same in its closing direction, and means to oppose movement of said valve in a closing direction at a predetermined speed of the motor with an effort always equal to the effort acting to close the valve, said efforts being unequal at other speeds, main adjusting means for said opposing means, means to lock said adjusting means against tampering, and manually operable means to adjust said opposing means within the limit set by the main adjusting means.

In testimony whereof we hereunto affix our signatures.

ROBERT G. HANDY.
ARTHUR A. BULL.